United States Patent
Albrecht et al.

(10) Patent No.: US 10,215,262 B2
(45) Date of Patent: Feb. 26, 2019

(54) TENSION ROLLER DEVICE

(71) Applicants: Dirk Albrecht, Eschweiler (DE);
Romuald Lescorail, Saint Cyr sur Loire (FR); Nicolas Tronquoy, Fondettes (FR)

(72) Inventors: Dirk Albrecht, Eschweiler (DE);
Romuald Lescorail, Saint Cyr sur Loire (FR); Nicolas Tronquoy, Fondettes (FR)

(73) Assignee: Aktiebolaget SKF, Göteborg (SE)

( * ) Notice: Subject to any disclaimer, the term of this patent is extended or adjusted under 35 U.S.C. 154(b) by 194 days.

(21) Appl. No.: 15/189,098

(22) Filed: Jun. 22, 2016

(65) Prior Publication Data
US 2016/0377152 A1    Dec. 29, 2016

(30) Foreign Application Priority Data
Jun. 24, 2015 (FR) ...................................... 15 55791

(51) Int. Cl.
*F16H 7/12* (2006.01)
*F16H 7/08* (2006.01)

(52) U.S. Cl.
CPC ......... *F16H 7/1281* (2013.01); *F16H 7/1218* (2013.01); *F16H 2007/081* (2013.01); *F16H 2007/0842* (2013.01); *F16H 2007/0865* (2013.01)

(58) Field of Classification Search
CPC ................. F16H 7/1281; F16H 7/1218; F16H 2007/081; F16H 2007/0842; F16H 2007/0865
See application file for complete search history.

(56) References Cited

U.S. PATENT DOCUMENTS

| 8,272,983 | B2* | 9/2012 | Rolando | F16H 7/1218 474/112 |
| 8,292,765 | B2* | 10/2012 | Rolando | F16H 7/1245 184/6.17 |
| 8,641,564 | B2* | 2/2014 | Rolando | F16H 7/1218 474/112 |
| 8,734,279 | B2* | 5/2014 | Ward | F16H 7/1218 474/112 |

(Continued)

FOREIGN PATENT DOCUMENTS

DE      102008033498 A1    1/2010
FR           2920851 A1    3/2009

*Primary Examiner* — Michael R Mansen
*Assistant Examiner* — Robert T Reese
(74) *Attorney, Agent, or Firm* — Bryan Peckjian; SKF USA Inc. Patent Dept.

(57) ABSTRACT

The tension roller device provides a support shaft, a securing plate that is fixed on the support shaft, an eccentric hub that is free to rotate relative to the shaft, and a spring that is arranged axially between the eccentric hub and the securing plate. The support shaft includes a stop surface, against which the securing plate is axially supported, and which is delimited radially on the outer side by a circular outer edge. At least one opening is formed in the securing plate, in order to delimit a tongue for radial centering of the spring. The opening is situated radially on the outer side relative to the circular outer edge of the stop surface of the support shaft.

8 Claims, 3 Drawing Sheets

(56) References Cited

U.S. PATENT DOCUMENTS

| | | | |
|---|---|---|---|
| 8,926,462 B2* | 1/2015 | Ward | ........................ F16H 7/12 |
| | | | 474/112 |
| 2008/0153642 A1 | 6/2008 | Baumuller | |
| 2010/0144473 A1 | 6/2010 | Ward et al. | |

* cited by examiner

TENSION ROLLER DEVICE

CROSS-REFERENCE

This application claims priority to French patent application no. 1555791 filed on Jun. 24, 2015, the contents of which are fully incorporated herein by reference.

FIELD OF THE INVENTION

The present invention relates to the field of automatic tension roller devices which are designed to cooperate with a traction unit, for example a distribution belt of an internal combustion engine of a motor vehicle.

BACKGROUND OF THE INVENTION

Tension roller devices of this type are generally used to maintain tension permanently on the distribution belt within a specific range.

A first type of tension roller device is known from document FR 2 920 851, comprising a pulley, a roller bearing on which the pulley is fitted, and an eccentric hub which supports the bearing. The device also provides a shaft to support the eccentric hub, a securing plate for fitting of the device on the associated engine block, and a torsion spring which is fitted between the securing plate and the eccentric hub. The device also comprises a spring support which is interposed axially between the torsion spring and the securing plate. The support makes it possible to ensure radial centring of the torsion spring.

A second type of tension roller device is differentiated only by the absence of the spring support for reasons of axial compactness, or cost. However, with this type of device, the radial centring of the torsion spring relative to the securing plate is not ensured. Radial displacement of the spring can then take place and give rise to premature wear.

The objective of the present invention is to eliminate this disadvantage.

SUMMARY OF THE INVENTION

More particularly, the objective of the present invention is to provide a tension roller device which is easy to produce and assemble which has a limited axial size, and is economical.

According to one embodiment, the tension roller device provides a support shaft, a securing plate which is fitted on the support shaft, an eccentric hub which is mobile in rotation relative to the shaft, and a spring which is arranged axially between the eccentric hub and the securing plate. The support shaft provides a stop surface, against which the securing plate is fitted supported axially, and which is delimited radially on the outer side by a circular outer edge.

At least one opening is formed in the securing plate, in order to delimit a tongue for radial centring of the spring. The opening is situated radially on the outer side relative to the outer edge of the stop surface of the support shaft.

The radial centering of the spring relative to the securing plate is obtained by means of the tongue formed directly on the plate. In addition, the opening which is formed in the securing plate is not situated axially opposite the stop surface of the support shaft. This makes it possible to guarantee good perpendicularity between the axis of the shaft and the face of the engine block against which the device is designed to be fitted. In fact, even if local deformations are created laterally on both sides of the opening during the formation of this opening in the securing plate, the stop surface of the support shaft is not fitted axially supported against these deformations. This therefore prevents incorrect positioning of the support shaft.

Preferably, the opening in the securing plate is at least partly offset radially towards the interior relative to the centring tongue.

According to one embodiment, the securing plate provides an outer radial portion which is axially opposite the spring, and an inner radial portion which is fitted axially supported against the stop surface of the support shaft, and in which the opening is at least partly formed. The securing plate can additionally provide a connection portion which extends axially between the inner and outer radial portions, the centring tongue being formed on the connection portion.

Advantageously, an outer surface of the centring tongue is offset radially towards the exterior relative to an outer surface of the connection portion.

Preferably, the securing plate can provide a guide portion which is provided with a bore, inside which the support shaft is fitted. The eccentric hub can provide a radial centring skirt of the spring which surrounds the guide portion of the securing plate radially. Advantageously, the skirt and the guide portion can delimit sealing by means of a narrow passage of the labyrinth type, such as to limit the intrusion by pollutant particles between the eccentric hub and the securing plate.

An end turn of the spring can surround the centring tongue of the securing plate radially.

According to one embodiment, the opening is formed in the securing plate by cutting.

According to a preferred embodiment, the support shaft provides a support surface which can come into contact against an engine block on the exterior of the device, the securing plate being offset axially on the spring side relative to the support surface.

BRIEF DESCRIPTION OF THE DRAWINGS

The present invention will be better understood by studying the detailed description of an embodiment taken by way of example which is in no way limiting, and is illustrated by the appended drawings, in which.

DETAILED DESCRIPTION OF THE INVENTION

Figure 1:
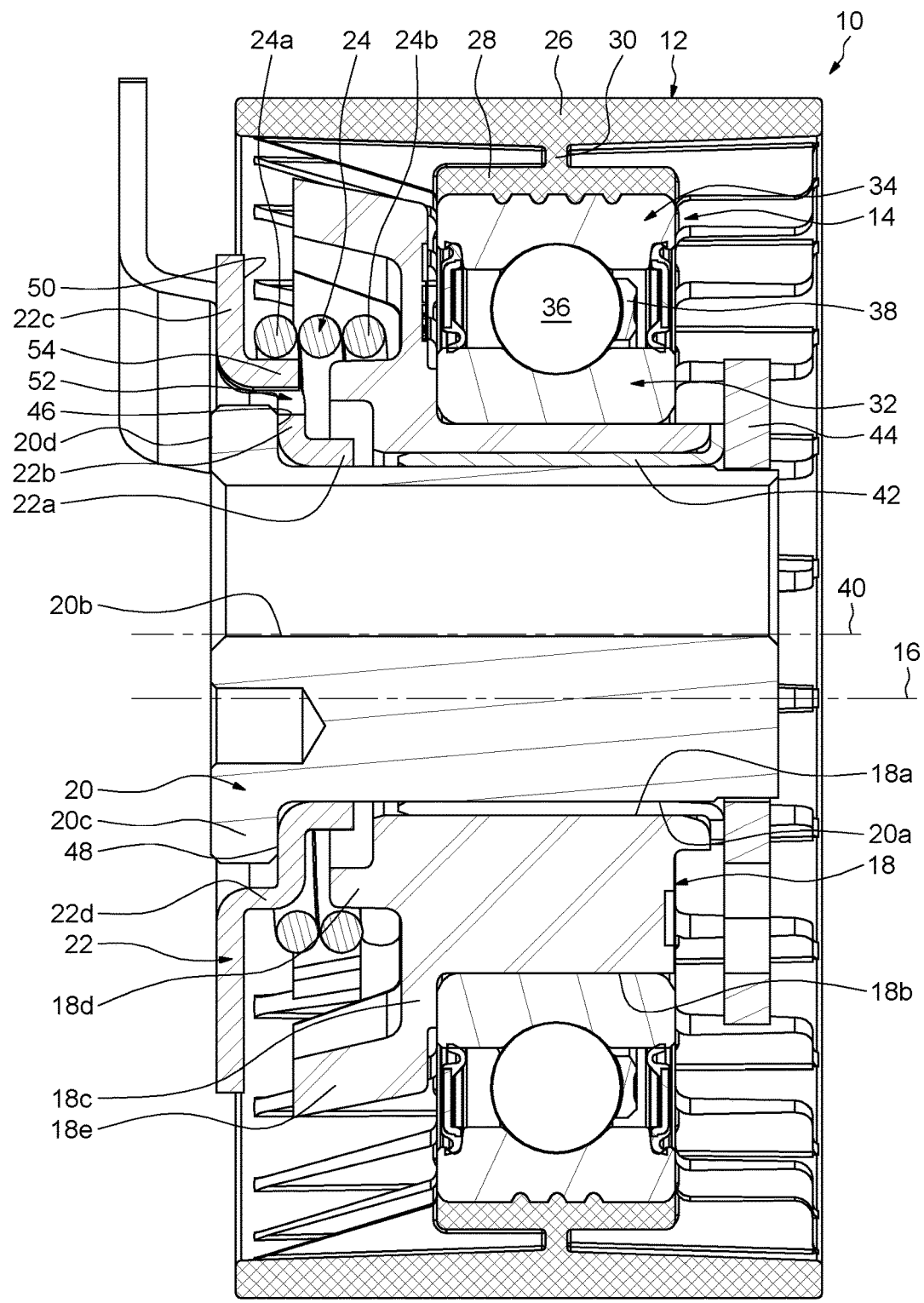
FIG. 1 is a view in axial cross-section of a tension roller device according to one embodiment.

In FIG. 1, the tension roller device which has the reference 10 as a whole provides a roller or pulley 12, a roller bearing 14 which supports the pulley, with a geometric axis 16, an eccentric hub 18 which supports the bearing, a support shaft 20 on which the hub is secured with rotation, a securing plate 22 secured on the shaft, and a spring 24 which is interposed axially between the plate and the eccentric hub. As will be described in greater detail hereinafter, the securing plate 22 provides a means for ensuring the centring and radial guiding of the spring 24.

The pulley 12 provides an outer axial portion 26 which provides an outer surface designed to cooperate with a belt (not represented), an inner axial portion 28, and a radial annular intermediate portion 30 which connects the portions. The outer 26 and inner portions 28 are coaxial to the axis 16.

Strengthening ribs (with no reference) are also provided between the outer 26 and inner 28 axial portions, and are connected on the intermediate portion 30.

The roller bearing 14 provides an inner ring 32, an outer ring 34 on which the pulley 12 is fitted, a row of rolling elements 36, which in this case are in the form of balls, arranged between rolling tracks of the rings, and a cage 38 which ensures maintenance of the circumferential spacing of the rolling elements 36. The bearing 14 also provides on each side an annular seal (with no reference) which is secured on the outer ring 34, in order to close the radial space which exists between the rings, and inside which the rolling elements 36 and the cage 38 are accommodated. In the embodiment illustrated, the inner 32 and outer 34 rings are solid.

In the embodiment illustrated, the pulley 12 is obtained by overmoulding of a plastic material, such as a polyamide, on the outer ring 32. This provides excellent cohesion between these parts. As a variant, the pulley could be glued on the outer ring 34, or it could also be made of metal plate, and be fitted on the ring. According to another variant, the pulley and the outer ring could be made in a single piece.

The eccentric hub 18 with an axis 40 supports the bearing 14 and the pulley 12. The axis 40 is offset radially relative to the axis 16. The inner ring 32 of the bearing is fitted on the eccentric hub 18. The eccentric hub 18 is produced in a single piece.

The eccentric hub 18 provides a cylindrical bore 18a with an axis 40, a cylindrical outer surface 18b, and a radial flange 18c which extends radially towards the exterior from the outer surface, and is situated axially on the securing plate 22 side. The flange 18c delimits a stop surface against which the inner ring 32 of the bearing is supported axially.

The eccentric hub 18 also provides inner 18d and outer 18e skirts which extend from the flange 18c in the direction of the securing plate 22. The skirts 18d, 18e extend axially. The outer skirt 18e surrounds the inner skirt 18d radially. The inner skirt 18d can ensure the radial centring of the spring 24. The spring 24 surrounds the skirt 18d radially.

The device 10 also provides a plain bearing 42 with an axis 40, which is interposed radially between the eccentric hub 18 and the support shaft 20. The bearing 42 is secured in the bore 18a of the eccentric hub, and comes radially into contact against an outer surface 20a of the support shaft. Axially on the side opposite the securing plate 22, the device 10 also provides a washer 44 which is secured on the outer surface 20a, and is fitted axially supported against the bearing 42.

The support shaft 20 provides a through bore 20b which can permit the passage of a securing unit, such as a screw, in order to fasten the shaft on the associated engine block (not represented). At the axial end which is situated on the engine block side, the support shaft 20 provides a radial flange 20c which extends towards the exterior, such as to augment a support surface 20d of the shaft on the engine block. The support surface 20d forms a frontal surface of the support shaft.

Figure 2:
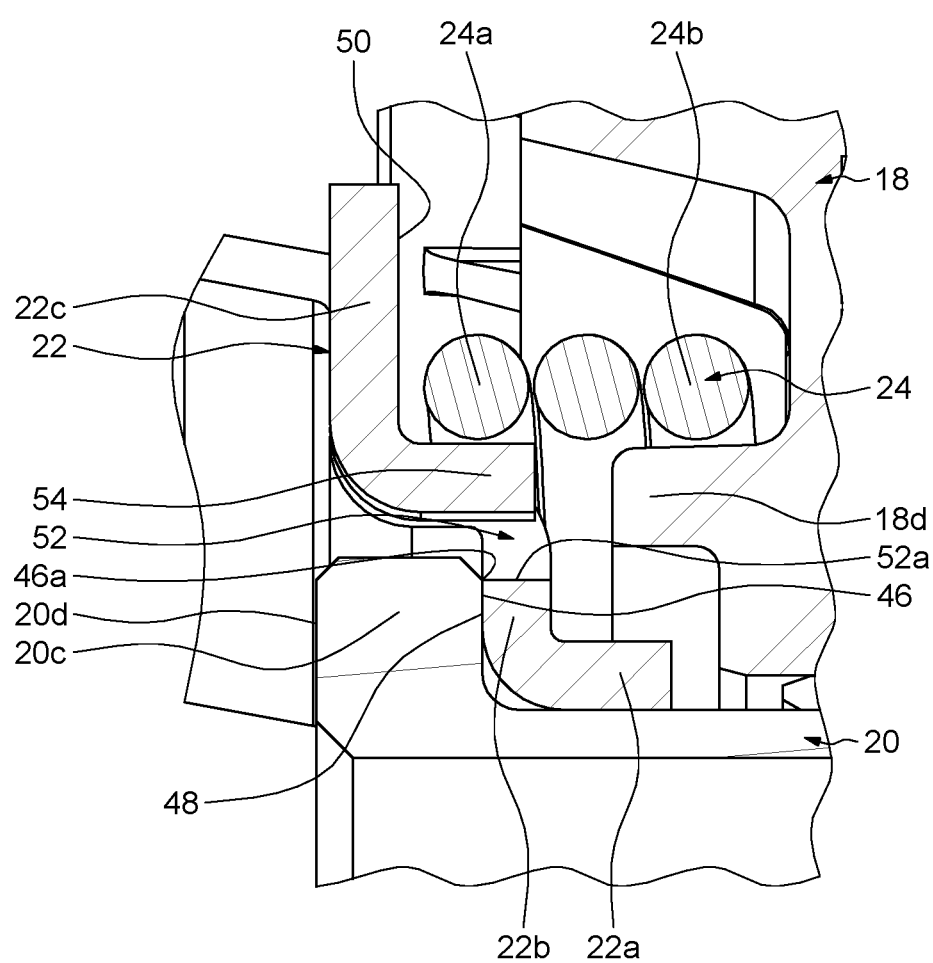
FIG. 2 is a detailed view of FIG. 1.

The flange 20c provides an annular stop surface 46 against which the securing plate 22 is fitted. The stop surface 46 is radial. The stop surface 46 is oriented axially on the side opposite the support surface 20d. The stop surface 46 is delimited radially on the outer side by a circular outer edge 46a (FIG. 2).

The securing plate 22 can advantageously be produced by cutting, drawing and bending of a metal plate. The plate 22 is produced in a single piece, i.e. in monobloc form. The securing plate 22 is fitted axially in direct contact with the stop surface 46 of the support shaft. The securing plate 22 is fitted radially on the outer surface 20a of the support shaft.

The securing plate 22 provides an annular axial guide portion 22a defining a bore (with no reference) which comes into contact with the outer surface 20a. The inner skirt 18d of the eccentric hub surrounds the guide portion 22a, leaving a small radial space between them, such as to limit the intrusion of pollutant particles in the direction of the plain bearing 42.

The plate 22 also provides inner 22b and outer 22c annular radial portions, and an annular axial intermediate connection portion 22d which connects the portions. The guide 22a and connection 22d portions extend axially on the same side. The inner radial portion 22b extends an end of the guide portion 22a radially towards the exterior. The radial portion 22b provides an annular stop surface 48 which is supported axially against the stop surface 46 of the support shaft. The connection portion 22d extends the inner radial portion 22b axially, and is connected to the outer radial portion 22c. The connection portion 22d extends from an edge with a large diameter of the radial portion 22b, and is connected to an edge with a small diameter of the outer radial portion 22c. The radial portion 22c delimits an axially oriented annular fitting surface 50 on the spring 24 side.

Figure 3:
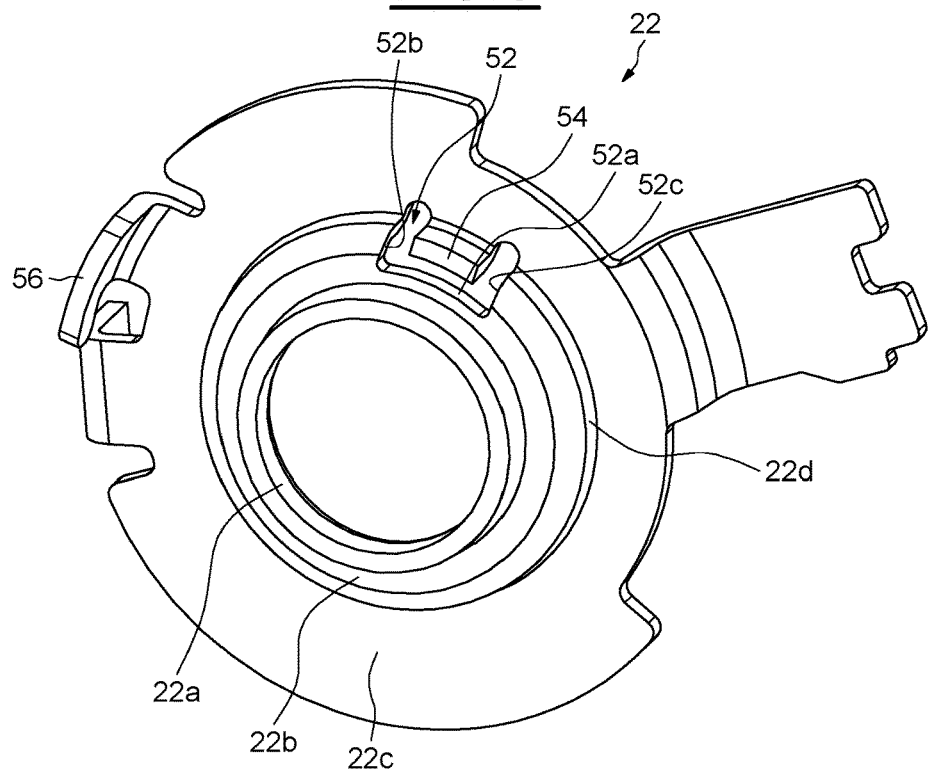
FIGS. 3 and 4 are views in perspective of a securing plate of the tension roller device in FIG. 1.
Figure 4:
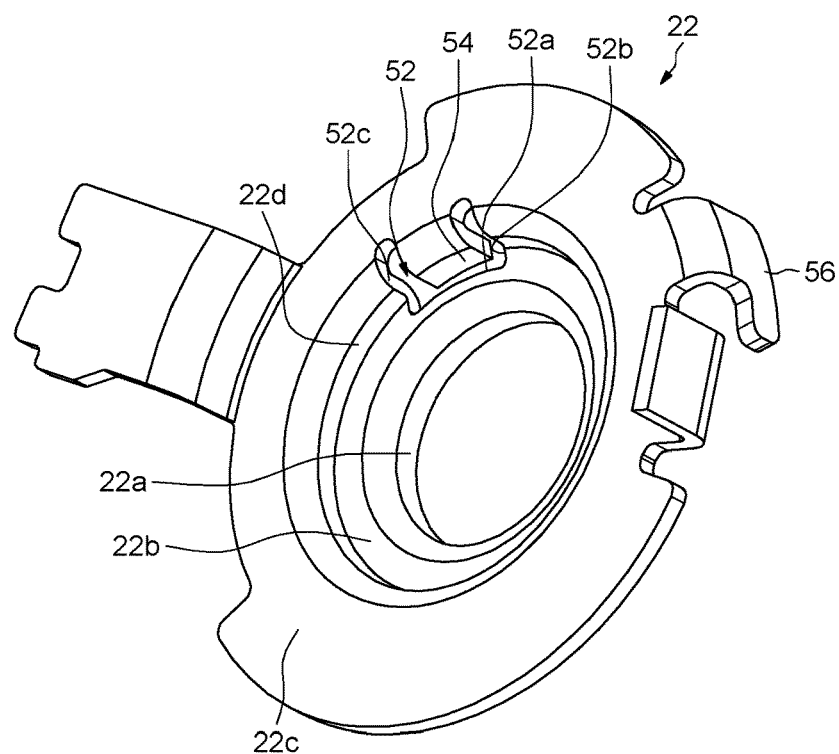

As illustrated more clearly in FIGS. 3 and 4, an opening 52 is formed in the securing plate 22, in order to delimit a tongue 54 on the plate. The tongue 54 fulfils a function of centring and radial guiding of the spring 24 relative to the securing plate 22. The opening 52 extends axially. The opening 52 extends in the thickness of the plate 22, and in this case it is a through opening. In the embodiment illustrated, the opening 52 is provided in the inner radial portion 22b, in the axial connection portion 22d, and in the outer radial portion 22c. Alternatively, the opening 52 could be provided only in the inner radial portion 22b and the axial connection portion 22d.

The opening 52 is partly offset radially towards the interior relative to the tongue 54. The opening 52 extends on an angular sector which is strictly smaller than 90°. In the embodiment illustrated, the opening 52 extends on an angular sector of between 20° and 30°. The opening 52 is delimited radially on the inner side by an inner edge 52a, and in the circumferential direction by two opposite lateral edges 52b, 52c. The opening 52 is obtained by local cutting of the plate 22.

With reference once more to FIG. 2, the opening 52 is situated radially on the outer side relative to the outer edge 46a of the stop surface 46 of the support shaft. This radial arrangement makes it possible to prevent the opening 52 from coming axially opposite the stop surface 46.

Thus, even if the operation of cutting in order to form the tongue 54 gives rise to deformation of the plate 22 in a lateral area adjacent to the opening 52, good perpendicularity is guaranteed between the axis of the support shaft and the face of the engine block against which the device 10 is fitted. In the embodiment illustrated, the inner edge 52a of the opening abuts radially against the outer edge 46a of the stop surface. Alternatively, the inner edge 52a could be offset radially towards the exterior relative to the outer edge 46a. The stop surface 46 of the support shaft is supported axially on its entire periphery against the securing plate 22.

The tongue 54 of the securing plate ensures maintenance of the radial position of the spring 24. The tongue 54 extends axially in the direction of the eccentric hub 18. The tongue 54 is formed by a section of the connection 22d portions and inner radial 22b portion which is obtained during the cutting of the opening 52. The tongue 54 is connected to the outer radial portion 22*d*. The tongue 54 is radially opposite the inner edge 52*a* of the opening, i.e. spaced from the edge. The tongue 54 is folded towards the exterior, such that its outer surface is offset radially towards the exterior relative to the outer surface of the connection portion 22*d*. The outer surface of the tongue forms a support surface for the spring 24. An end turn 24*a* of the spring surrounds the tongue 54. This end turn 24*a* is fitted in a radially fixed manner around the tongue 54. The end turn 24*a* is retained radially in position by the tongue 54. In the embodiment illustrated, the end turn 24*a* is secured on the securing plate 22 by means of a lug 56 which extends the outer radial portion 22*c*.

The securing plate 22 and the eccentric hub 18 delimit a space inside which the spring 24 is accommodated. In the embodiment illustrated, this receptacle is delimited axially by the flange 18*c* of the eccentric hub and the outer radial portion 22*c* of the securing plate. The receptacle is delimited radially by the skirt 18*d* of the hub and the connection portion 22*d* of the plate on the inner side, and by the skirt 18 on the outer side. As previously stated, the end turn 24*a* of the spring is fastened on the securing plate 22. An opposite end turn 24*b* of the spring is integral with the eccentric hub 18. The spring 24 exerts a permanent circumferential force on the eccentric hub 18. After securing of the support shaft 20 on the engine block, the eccentric hub 18 can turn relative to the shaft under the effect of the permanent force exerted by the spring 24.

In the embodiments described, a single centring tongue is provided on the securing plate. As a variant, it is possible to provide a plurality of tongues.

The invention has been illustrated on the basis of a tension roller device comprising a roller bearing provided with at least one row of rolling elements which are arranged between the inner and outer rings. As a variant, the bearing can be of the sliding type, and can be constituted by an annular body, which for example is made of thermoplastic material, and can provide radial grooves which can be filled with lubricant. According to another variant, the sliding bearing can provide two tracks or rings which slide directly on one another.

The invention claimed is:
1. A tension roller device comprising:
a support shaft,
a securing plate that is fitted on the support shaft,
an eccentric hub that is mobile in rotation relative to the, and
a spring arranged axially between the eccentric hub and the securing plate, the support shaft having a stop surface against which the securing plate is axially supported, and which is delimited radially on the outer side by a circular outer edge, wherein
at least one opening is formed in the securing plate, in order to delimit a tongue for radial centering of the spring, the opening being positioned radially on the outer side relative to the outer edge of the stop surface of the support shaft, wherein
the securing plate comprises a radially outer portion that is axially opposite of the spring, and a radially inner portion is axially supported against the stop surface of the support shaft, and wherein the opening is at least partly formed, and wherein
the securing plate additionally comprises a connection portion that extends axially between the inner and outer radial portions, the centering tongue being formed on the connection portion.

2. The device according to claim 1, wherein the opening in the securing plate is at least partly offset radially towards the interior relative to the centering tongue.

3. The device according to claim 1, wherein an outer surface of the centering tongue is offset radially towards the exterior relative to an outer surface of the connection portion.

4. The device according to claim 1, wherein the securing plate comprises a guide portion that is provided with a bore, inside which the support shaft is fitted.

5. The device according to claim 4, wherein the eccentric hub comprises a radial centring skirt of the spring that surrounds the guide portion of the securing plate radially.

6. The device according to claim 1, wherein an end turn of the spring surrounds the centering tongue of the securing plate radially.

7. The device according to claim 1, wherein the opening is formed in the securing plate by cutting.

8. The device according to claim 1, wherein the support shaft comprises a support surface that comes into contact against an engine block on the exterior of the device, the securing plate being offset axially on the spring side relative to the support surface.

* * * * *